United States Patent
Lambert et al.

(10) Patent No.: US 11,803,493 B2
(45) Date of Patent: Oct. 31, 2023

(54) SYSTEMS AND METHODS FOR MANAGEMENT CONTROLLER CO-PROCESSOR HOST TO VARIABLE SUBSYSTEM PROXY

(71) Applicant: Dell Products L.P., Round Rock, TX (US)

(72) Inventors: Timothy M. Lambert, Austin, TX (US); Pablo R. Arias, Austin, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/106,390

(22) Filed: Nov. 30, 2020

(65) Prior Publication Data
US 2022/0171726 A1    Jun. 2, 2022

(51) Int. Cl.
*G06F 13/36* (2006.01)
*G06F 13/42* (2006.01)

(52) U.S. Cl.
CPC .......... *G06F 13/36* (2013.01); *G06F 13/4282* (2013.01); *G06F 2213/0016* (2013.01)

(58) Field of Classification Search
CPC ............................. G06F 13/36; G06F 13/4282
See application file for complete search history.

(56) References Cited

U.S. PATENT DOCUMENTS

| | | | | |
|---|---|---|---|---|
| 7,509,391 | B1* | 3/2009 | Chauvel | G06F 15/167 709/215 |
| 7,577,729 | B1* | 8/2009 | Umbehocker | G06F 3/0607 709/213 |
| 9,591,582 | B1* | 3/2017 | Rabii | H04L 43/028 |
| 2005/0278460 | A1* | 12/2005 | Shin | G06F 9/5011 710/1 |
| 2009/0083844 | A1* | 3/2009 | Eldar | G06F 21/85 726/11 |
| 2013/0145010 | A1* | 6/2013 | Luna | H04W 40/248 709/223 |
| 2014/0119451 | A1* | 5/2014 | Sethuraman | H04N 19/124 375/240.16 |
| 2015/0028309 | A1* | 1/2015 | Ono | H01L 27/322 257/40 |
| 2015/0058969 | A1* | 2/2015 | Ringdahl | H04L 12/4675 726/15 |
| 2016/0026742 | A1* | 1/2016 | Schelle | G06F 30/39 711/104 |
| 2016/0357701 | A1* | 12/2016 | Lee | G06F 11/0745 |
| 2019/0065083 | A1* | 2/2019 | Sen | G06F 9/505 |
| 2020/0133912 | A1* | 4/2020 | Gupta | G06F 13/4282 |

* cited by examiner

Primary Examiner — Henry Tsai
Assistant Examiner — Christopher A Daley
(74) Attorney, Agent, or Firm — Jackson Walker L.L.P

(57) ABSTRACT

An information handling system may include a host system comprising a host system processor and a management controller communicatively coupled to the host system processor and comprising a main processor for implementing functionality of the management controller and a co-processor communicatively coupled to the host system processor and configured to implement a proxy to the host system to enable the host system to access devices managed by the management controller.

24 Claims, 1 Drawing Sheet

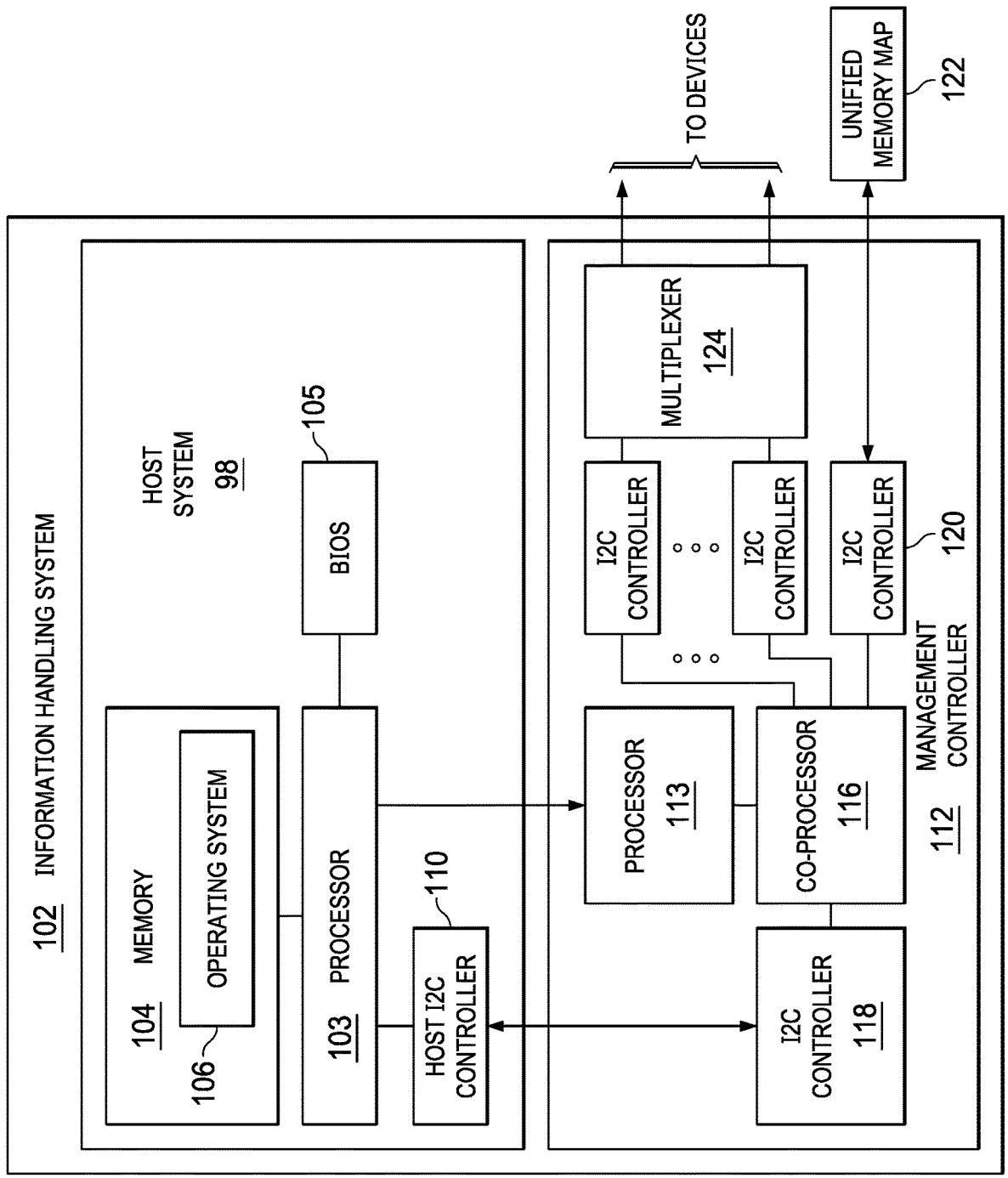

SYSTEMS AND METHODS FOR MANAGEMENT CONTROLLER CO-PROCESSOR HOST TO VARIABLE SUBSYSTEM PROXY

TECHNICAL FIELD

The present disclosure relates in general to information handling systems, and more particularly to methods and systems for enabling host to variable subsystem proxy implemented by a management controller co-processor in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many instances, it may be desirable to allow a host system and host applications of an information handling system to access devices managed by a management controller (e.g., a baseboard management controller). An example is allowing a host system to access a sideband interface of a Peripheral Component Interconnect Enhanced (PCIe) adapter (e.g., for attestation, monitoring, image update, etc.). Using existing approaches, no mechanism exists for a host system to have knowledge of device mappings between the management controller and the devices. In addition, using traditional approaches, providing host access to device mappings would require duplication of resources and the maintenance of two similar memory maps to provide access to the management controller and the host system regarding inventory, power states, and general hardware status.

SUMMARY

In accordance with the teachings of the present disclosure, the disadvantages and problems associated with existing approaches for enabling host system access to device sideband interfaces may be reduced or eliminated.

In accordance with embodiments of the present disclosure, an information handling system may include a host system comprising a host system processor and a management controller communicatively coupled to the host system processor and comprising a main processor for implementing functionality of the management controller and a co-processor communicatively coupled to the host system processor and configured to implement a proxy to the host system to enable the host system to access devices managed by the management controller.

In accordance with these and other embodiments of the present disclosure, a method may include, in a host system comprising a host system processor and a management controller communicatively coupled to the host system processor and comprising a main processor for implementing functionality of the management controller and a co-processor communicatively coupling the co-processor to the host system processor and implementing, by the co-processor, a proxy to the host system to enable the host system to access devices managed by the management controller.

In accordance with these and other embodiments of the present disclosure, a management controller configured to be disposed in an information handling system and communicatively coupled to a host system processor of a host system of the information handling system, may further be configured to communicatively couple a co-processor of the management controller to the host system processor and implement, via the co-processor, a proxy to the host system to enable the host system to access devices managed by the management controller.

Technical advantages of the present disclosure may be readily apparent to one skilled in the art from the FIGURES, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

The FIGURE illustrates a block diagram of an example information handling system, in accordance with embodiments of the present disclosure.

DETAILED DESCRIPTION

Preferred embodiments and their advantages are best understood by reference to the FIGURE, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

The FIGURE illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in the FIGURE, information handling system 102 may include a processor 103, a memory 104 communicatively coupled to processor 103, a basic input/output system (BIOS) 105 communicatively coupled to processor 103, a host Inter-Integrated Circuit (I2C) controller 110 communicatively coupled to processor 103, a management controller 112 communicatively coupled to processor 103, and a unified memory map 122 communicatively coupled to management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in the FIGURE, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in the FIGURE as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Host I2C controller 110 may be configured to provide a communications interface (e.g., an I2C interface) between host system 98 and a co-processor 116 of management controller 112, to enable host system 98 to access unified memory map 122 via a proxy maintained by co-processor 116, as described in greater detail below. In operation, during boot of information handling system 102, BIOS 105 may cause the communications interface between host I2C controller 110 and co-processor 116 to remain enabled after end of power-on/self-test (POST) of information handling system 102.

Management controller 112 may be configured to provide management facilities for management of information handling system 102. Such management may be made by management controller 112 even if information handling system 102 is powered off or powered to a standby state. Management controller 112 may include a processor 113, and a co-processor 116 communicatively coupled to processor 113. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in the FIGURE, processor 113 may be communicatively coupled to processor 103. Such coupling may be via a Universal Serial Bus (USB), System Management Bus (SMBus), general purpose input/output (GPIO) channel and/or one or more other communications channels.

Co-processor 116 may comprise a special-purpose processor used to supplement functionality of processor 113. For example, in some embodiments, co-processor 116 may comprise an input/output (I/O) processor for providing I/O operations with respect to other devices. In these and other embodiments, operations performed by co-processor 116 may include floating point arithmetic, graphics acceleration, signal processing, string processing, and/or encryption. Off-loading of specialized tasks from processor 113 to co-processor 116 may accelerate performance.

As shown in the FIGURE, management controller 112 may include an I2C controller 118. I2C controller 118 may be configured to provide a communications interface (e.g., an I2C interface) between host I2C controller 110 and co-processor 116, to enable host system 98 to access unified memory map 122 via a proxy maintained by co-processor 116, as described in greater detail below.

As also shown in the FIGURE, management controller 112 may also include a plurality of "downstream" I2C controllers 120 (as opposed to "upstream" I2C controller 118). One or more of such I2C controllers 120 may be coupled between co-processor 116 and a multiplexer 124 to enable sideband interface (e.g., I2C interface) access between co-processor 116 and devices of information handling system 102. Further, a single I2C controller 120 may be coupled between co-processor 116 and unified memory map 122, to enable access between co-processor 116 and unified memory map 122.

Unified memory map 122 may be embodied in a memory or other suitable non-transitory computer readable medium. For example, in some embodiments, unified memory map 122 may be implemented using a complex programmable logic device. The content of unified memory map 122 may set forth a mapping table of mappings of the platform I2C bus of information handling system 102, topology of multiplexer 124, endpoint device topologies and addresses (e.g., based on platform type of discovery sweep), supported communication protocols, bus speeds, and/or other parameters.

Further, to enable access to host system 98 of unified memory map 122, co-processor 116 may configure unified memory map 122 as a child device. Accordingly, co-processor 116 may emulate unified memory map 122 as a target device on a communication bus (e.g., I2C bus), enabling co-processor 116 to serve as a proxy between host system 98 and unified memory map 122, which host system 98 may access via host I2C controller 110 and its interface with co-processor 116.

Accordingly, the systems and methods disclosed herein allow for consolidation of the management controller 112 to unified memory map 122 interface and the host system 98 to unified memory map 122 interface to a single interface managed by co-processor 116, which may, compared with existing approaches, reduce cost and complexity of hardware needed to share resources between host system 98 and management controller 112.

Further, the systems and methods described herein may enable a proxy by co-processor 116 to allow host system 98 access to devices managed by management controller 112, and may allow such access via standard drivers. Co-processor 116 may provide dedicated resources for presenting supported proxied devices access paths, and protocol support, without reliance on a main processor 113 of management controller 112, which may be offline or inaccessible from time to time.

Thus, co-processor 116 may resolve a universally common physical host interface and application programming interface for: (a) allowing the host to learn the management controller 112 managed device access topology (e.g., via unified memory map 122); (b) providing a proxy for secure access control of the management controller 112 managed devices; and (c) enabling traffic and bus ownership arbitration for such access.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the FIGURE and described above, the principles of the present disclosure may be implemented using any number of techniques, whether currently known or not. The present disclosure should in no way be limited to the exemplary implementations and techniques illustrated in the FIGURE and described above.

Unless otherwise specifically noted, articles depicted in the FIGURE are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing FIGURE and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor; and
   a management controller communicatively coupled to the host system processor and comprising:
      a main processor for implementing functionality of the management controller; and
      a co-processor communicatively coupled to the host system processor and configured to implement a proxy to the host system independently from the main processor to enable the host system to access devices managed by the management controller.

2. The information handling system of claim 1, wherein the co-processor is communicatively coupled to the host system processor via an Inter-Integrated Circuit (I2C) bus.

3. The information handling system of claim 1, further comprising a unified memory map communicatively coupled to the co-processor as a child device of the co-processor and emulated to and accessible to the host system as a target device via the co-processor.

4. The information handling system of claim 3, wherein the unified memory map sets forth mappings of a communications bus of the information handling system.

5. The information handling system of claim 3, wherein the unified memory map sets forth a topology of a multiplexer communicatively coupled to the co-processor.

6. The information handling system of claim 3, wherein the unified memory map sets forth endpoint topologies and addresses of the devices managed by the management controller.

7. The information handling system of claim 3, wherein the unified memory map sets forth supported communication protocols of the devices managed by the management controller.

8. The information handling system of claim 3, wherein the unified memory map sets forth bus speeds of the devices managed by the management controller.

9. A method comprising, in a host system comprising a host system processor and a management controller communicatively coupled to the host system processor and comprising a main processor for implementing functionality of the management controller and a co-processor:
   communicatively coupling the co-processor to the host system processor; and
   implementing, by the co-processor and independently from the main processor, configuring a co-processor to behave as a proxy to the host system to enable the host system to access devices managed by the management controller.

10. The method of claim 9, wherein communicatively coupling the co-processor to the host system processor comprises communicatively coupling the co-processor to the host system processor via an Inter-Integrated Circuit (I2C) bus.

11. The method of claim 9, further comprising:
   communicatively coupling a unified memory map to the co-processor as a child device of the co-processor; and
   emulating the unified memory map to the host system as a target device via the co-processor.

12. The method of claim 11, wherein the unified memory map sets forth mappings of a communications bus of the information handling system.

13. The method of claim 11, wherein the unified memory map sets forth a topology of a multiplexer communicatively coupled to the co-processor.

14. The method of claim 11, wherein the unified memory map sets forth endpoint topologies and addresses of the devices managed by the management controller.

15. The method of claim 11, wherein the unified memory map sets forth supported communication protocols of the devices managed by the management controller.

16. The method of claim 11, wherein the unified memory map sets forth bus speeds of the devices managed by the management controller.

17. A management controller configured to be disposed in an information handling system and communicatively coupled to a host system processor of a host system of the information handling system, and further configured to:
   communicatively couple a co-processor of the management controller to the host system processor; and
   implement, via the co-processor and independently from the main processor, a proxy to the host system to enable the host system to access devices managed by the management controller.

18. The management controller of claim 17, wherein communicatively coupling the co-processor to the host system processor comprises communicatively coupling the co-processor to the host system processor via an Inter-Integrated Circuit (I2C) bus.

19. The management controller of claim 17, further configured to:
   communicatively couple a unified memory map to the co-processor as a child device of the co-processor; and
   emulate the unified memory map to the host system as a target device via the co-processor.

20. The management controller of claim 19, wherein the unified memory map sets forth mappings of a communications bus of the information handling system.

21. The management controller of claim 19, wherein the unified memory map sets forth a topology of a multiplexer communicatively coupled to the co-processor.

22. The management controller of claim 19, wherein the unified memory map sets forth endpoint topologies and addresses of the devices managed by the management controller.

23. The management controller of claim 19, wherein the unified memory map sets forth supported communication protocols of the devices managed by the management controller.

24. The management controller of claim 19, wherein the unified memory map sets forth bus speeds of the devices managed by the management controller.

\* \* \* \* \*